Sept. 25, 1928.　　　　　　　　　　　　　　　　　　1,685,502
W. J. PEARMAIN
CLUTCH AND TRANSMISSION MECHANISM
Filed Feb. 9, 1925　　　　　3 Sheets-Sheet 1
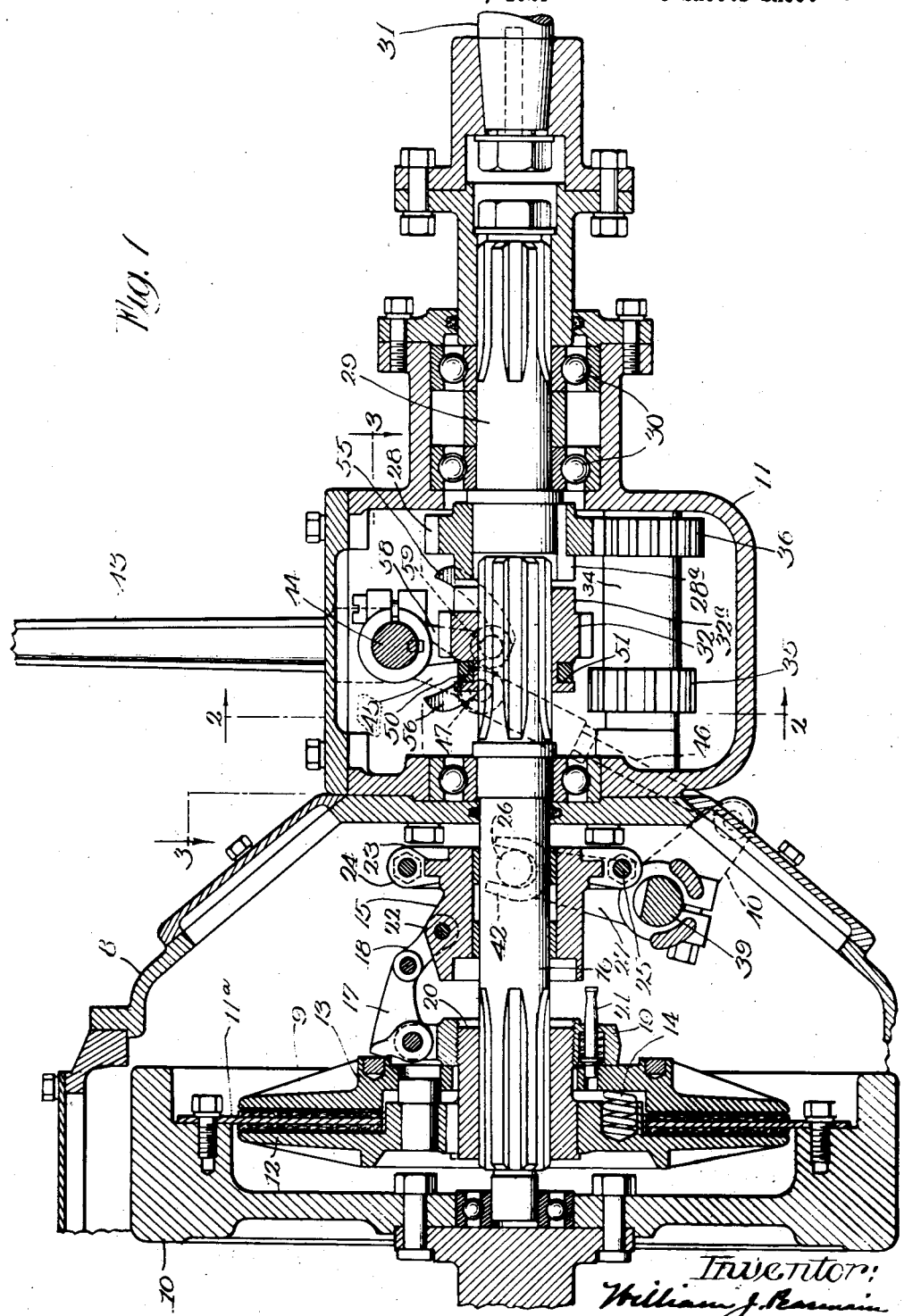

Sept. 25, 1928.  
W. J. PEARMAIN  
1,685,502  
CLUTCH AND TRANSMISSION MECHANISM  
Filed Feb. 9, 1925   3 Sheets-Sheet 2
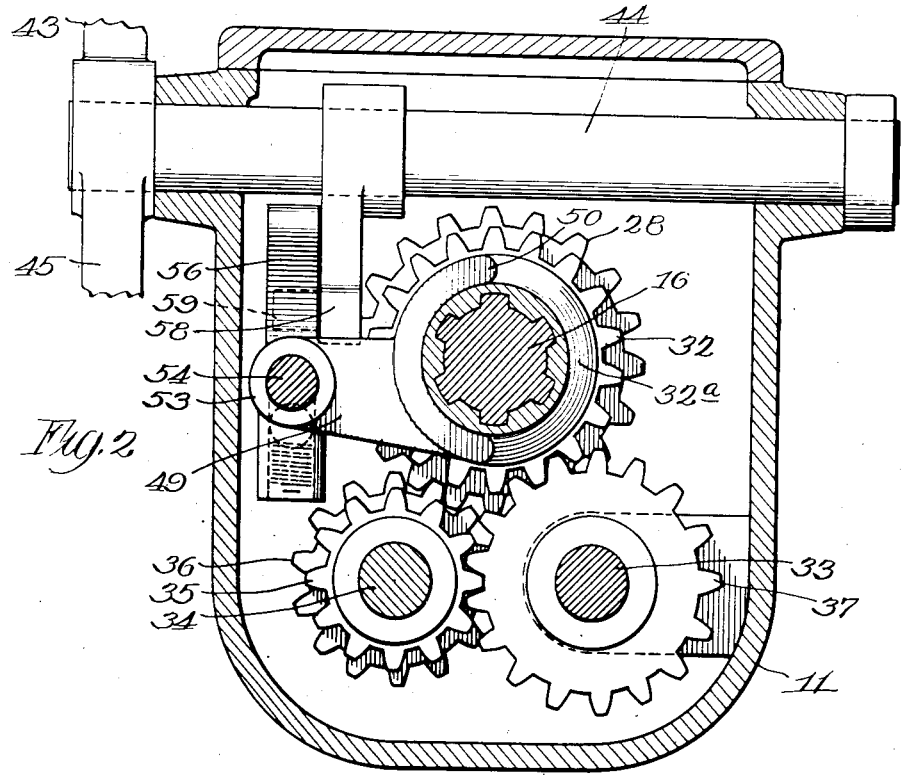
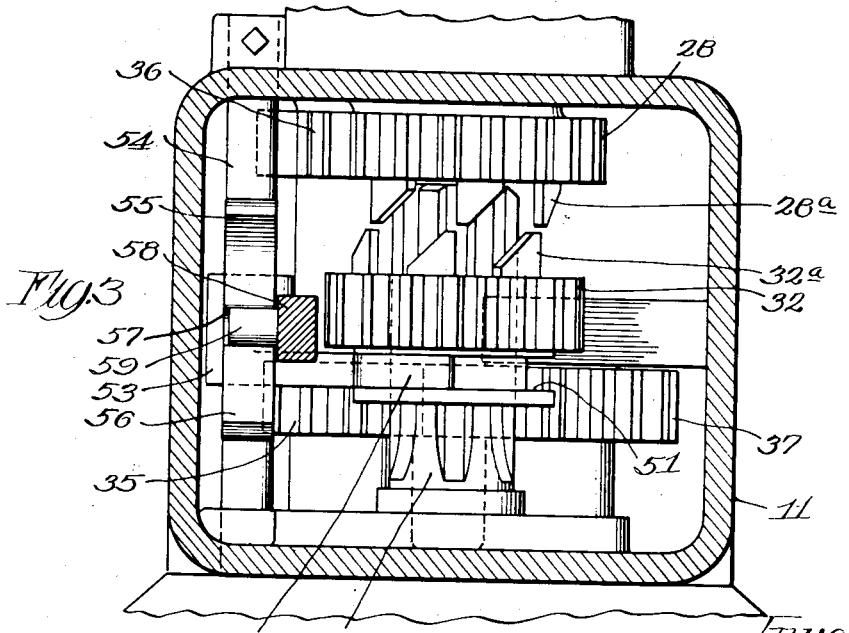

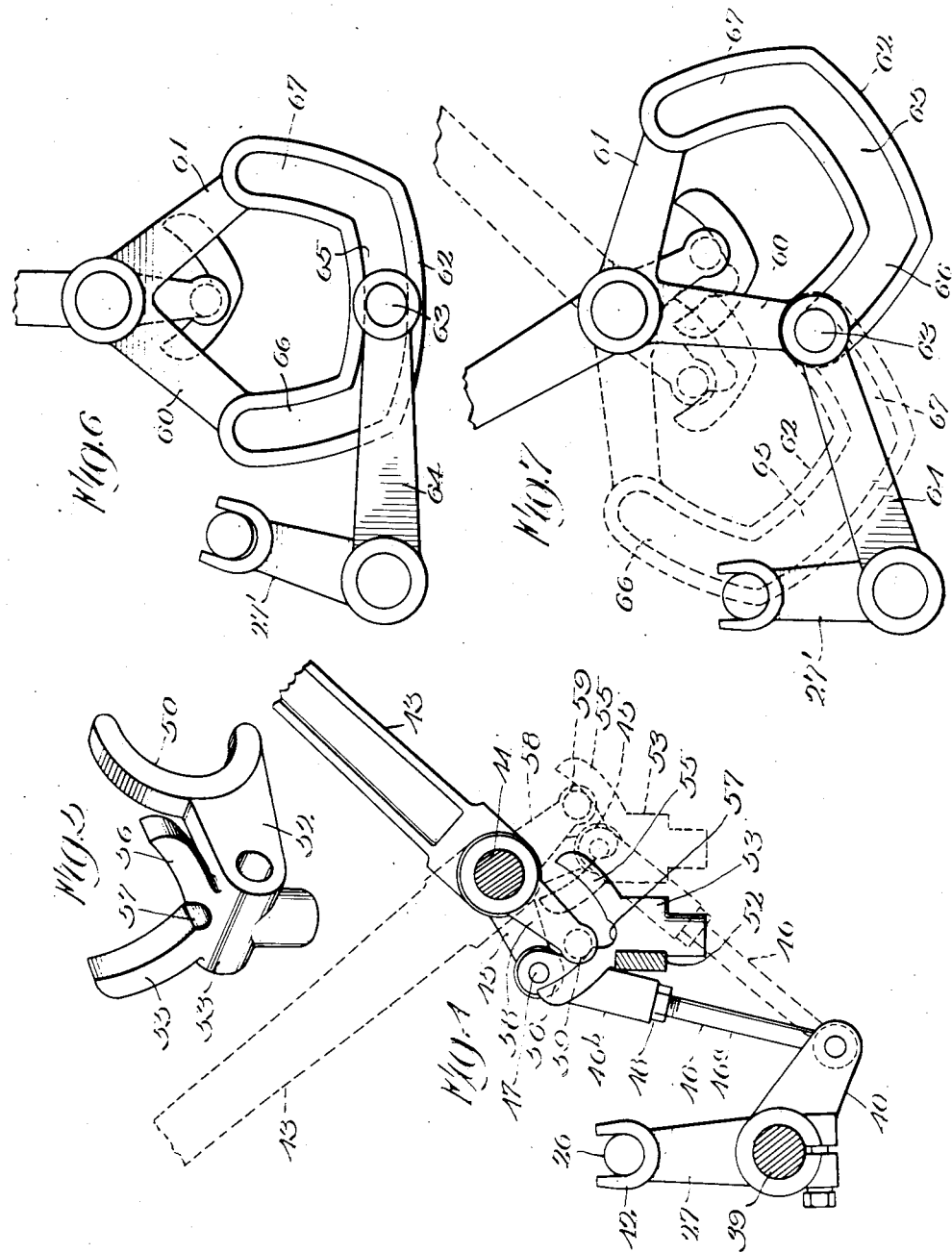

Patented Sept. 25, 1928.

1,685,502

UNITED STATES PATENT OFFICE.

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN.

CLUTCH AND TRANSMISSION MECHANISM.

Application filed February 9, 1925. Serial No. 7,803.

My invention has for its object to provide simple and effective means whereby the clutch and the shifting gear may be operated from a single handle, the latter being moved while the clutch is open or disengaged at the beginning of the movement of the hand lever from neutral position, the closing or engagement of the clutch being effected during the final part of the movement of the handle after and while the shifting gear is in engagement.

In the drawings Fig. 1 is a vertical longitudinal section of a clutch and transmission mechanism embodying a preferred form of my invention; Fig. 2 a vertical transverse section on the plane of the line 2—2 of Fig. 1 looking in the direction of the arrows; Fig. 3 a horizontal section on the plane of the broken line 3—3 through the transmission housing; Fig. 4 a vertical longitudinal section partly in elevation, parts being omitted to better show the operation; Fig. 5 an isometric view of a detail; Fig. 6 an elevation of certain details of a modification showing the parts in neutral position and Fig. 7 a similar view showing the parts in one extreme position in full lines and in the other extreme position in dotted lines. Each part is identified by the same reference character wherever it occurs in the several views.

Referring first to the form of the invention shown in Figs. 1 to 5 inclusive I have shown at 8 the housing for the clutch 9 and at the flywheel 10 and at 11 the housing for the transmission mechanism, the two housings being bolted together as shown to make a continuous rigid enclosure.

For the present purpose the clutch 9 may be of any suitable or approved form and I have disclosed a known form in which an annular plate member 11ª is bolted to the flywheel and constitutes the driving member of the clutch, the driven members 12, 13 being arranged on opposite sides of the plate 11 with intermediate friction linings between them and said plate. The members 12, 13 are normally forced away from each other and from the intermediate plate 11 by springs 14. The means for pressing the driven members of the clutch into engagement with the driving plate thereof comprises a collar 15 which is reciprocable upon the driven shaft 16, the levers 17 and links 18. The levers 17 are pivoted upon an adjustable collar 19 having threaded engagement with the sleeve 20 upon which the driven members 12, 13 of the clutch are slidably mounted, a pin 21 serving to block the collar in adjusted position. Links 18 are pivoted to the longer arms of the levers 17 and to webs 22 projecting radially and longitudinally from the sleeve 15. The latter is formed with a circumferential flange 23 which is embraced by a split collar 24 the members of the collar being bolted together at 25. The collar carries a pair of oppositely projecting trunnions 26 which are engaged by the yoke lever 27 to be presently described. While the clutch which I have just described is suitable for the purpose of my invention its specific construction forms no part of the present invention.

The reversing transmission mechanism which I have illustrated for the purpose of exemplifying my invention and which is mounted in the housing 11 to which reference has heretofore been made comprises, as usual, a gear wheel 28 fast on a short shaft 29, mounted in roller bearings 30 in the housing. Shaft 29 is shown as connected in a well known manner to the shaft 31 by which motion is transmitted to the device to be driven such as the propeller shaft of a motor boat or the traction wheel of a vehicle. Shafts 16, 29 are concentrically mounted in the housing. A shiftable pinion 32 having a crown clutch element 32ª is keyed upon the end of the shaft 16 for rotation therewith and manual adjustment longitudinally thereof.

The above mentioned gear wheel 28 is likewise formed with a clutch element 28ª so that when the shifting gear is moved to the right, as seen in Fig. 1, the shaft 29 may be direct driven from the shaft 16. A pair of shafts 33, 34 are mounted in the housing below and parallel to shaft 16 and on opposite sides of the central vertical plane thereof, shaft 34 being formed or provided with gear wheels 35, 36, the latter of which is in the plane of the gear 28. Shaft 33 is formed or provided with a gear 37 which meshes with gears 28 and 36. Gear 35 is to the left of the central position of gear 32, as seen in Fig. 1, and so designed and arranged that when the shifting gear is moved to the left it is brought into mesh with said gear 35. When so in mesh shaft 29 is driven from shaft 16 through gears 32, 35, shaft 34 and gears 36, 37, 28, in the reverse direction from the drive when the clutch members are in engagement. There is nothing novel per se in the transmission and reversing mechanism just described and other such mechanisms may be substituted therefor.

In order to properly shift the sliding gear of the transmission and the movable member of the clutch 9, at the proper relative times by the motion of a single controlled lever I provide the following instrumentalities. The yoke 27 is keyed up on a transverse shaft 39 suitably journaled in one of the walls of the casing and projecting therethrough, the end of the shaft beyond the casing being formed or provided with a crank arm 40. The upper ends of the arms of the yoke are of course forked as at 42 to engage the pintles 26 on the collar of the clutch actuating sleeve heretofore described. The hand lever 43 is mounted upon a transverse shaft 44 journaled in the upper part of the transmission housing. The hand lever 43 is also formed or provided with an arm 45 which projects downwardly and at a slight angle thereto and is formed at its lower end with an eye 47, see dotted lines Fig. 1. Arms 40, 45 are connected by an adjustable link 46 (see dotted lines Fig. 1 and full lines Fig. 4) which is pivoted to said arms at their extremities. The link 46 is shown as composed of telescoping sections 46ª, 46ᵇ, the former being threaded into the latter and a lock nut 48 employed for preventing relative movement of the parts. The parts just described and the clutch mechanism are so designed that when the handle 43 is in the intermediate position shown in Fig. 1 the sleeve 15 is retracted and hence the clutch members are out of engagement, and there is sufficient lost motion in the clutch operating connection so that the clutch remains disengaged during the initial movement of the hand lever in either direction until the shifting gear is engaged as will presently appear.

In order to shift the gear 32 I provide a shifting fork 49 the crotch 50 of which engages a neck 51 formed on the hub of said pinion. The shank 52 of the fork is formed with a perforated boss 53 which travels on a rod 54 arranged parallel to the axis of the shaft 16.

In order that the hand lever when moved from the neutral or intermediate position shown in Fig. 1 may move the shifting gear into the direct drive position or to the reverse position as the case may be before the main clutch is engaged, and thereafter leave the shifting gear stationary while the lever is completing its movement to engage the main clutch, the shifting fork 49 is formed or provided with the upwardly extending arcuate arms or horns 55, 56 formed with the intermediate notch or depression 57, and the shaft 44 on which the hand lever is mounted is formed or provided with an arm 58 having an offset pin 59 to engage said arcuate arms and notch. The notch is of such depth and the arm 58 and pin 59 so designed that when the lever is swung in one direction or the other the shifting fork and shifting gear are moved to engaging position before the pin leaves the notch. The internal curve of each of the arms 55, 56 is such that after the proper position of engagement is reached by the gear 32 the pin 59 riding up the arc of the arm effects no further movement of the pinion but serves as a stop to prevent its return until the hand lever again returns toward the neutral position. The pin then again engages the notch or the far wall thereof and disengages the pinion 32 before the neutral position of the hand lever is reached. The shifting of the pinion in either direction is effected in the same manner but, of course, with a reversed movement of the hand lever. The distance the pinion is moved in either direction from the central or neutral position will depend on the height of the corresponding wall of the notch, which is accordingly designed to effect the required extent of movement.

From the foregoing description it will be apparent that during the initial position of the movement of the hand lever 43 in either direction from the vertical position the main clutch will not be engaged, but the shifting gear is immediately moved into engagement and it is only after this engagement has been completed that the main clutch is thrown into operation. When the hand lever is returned toward neutral position the clutch is first disengaged after which the shifting gear is returned to neutral position.

In Figs. 6 and 7 I have shown a modified form of connection between the hand lever and the clutch shifting sleeve in order to provide for the movement of the hand lever necessary to shift the gear before the clutch is operated, the gear shifting connection being the same as in the first described form of the invention. In this second form of the invention the hand lever, is formed or provided with a pair of arms 60, 61 which are connected by a web or forging 62 in which is formed a cammed slot, and this slot is directly engaged by a pin or roller 63 on the arm 64 of the clutch shifting yoke 27'. The intermediate portion 65 of the slot is concentric with the pivot of the hand lever and the end portions 66, 67 are eccentric thereto. Obviously during the initial motion of the lever in either direction from central position during which the transmission engagement is effected, there will be no actuation of the clutch shifting lever but after the pin or roller 63 enters the eccentric end 66 or 67 of the slot the arm 64 will be shifted to throw the clutch into engagement.

Obviously if desired the reverse gearing may be so designed as to obtain the same speed as in the forward or direct drive and this is of advantage when the mechanism is used in power driven boats.

I claim:

1. In a device of the class described a clutch, a shaft driven thereby, a clutch operating sleeve on said shaft, a second shaft in line with the first said shaft, transmission mechanism for driving the second said shaft from the first including a reversing shifting gear, a hand lever for shifting said clutch operating sleeve and gear, connections between the lever and sleeve such that the clutch is operated only at the respective ends of the arc of movement of the lever, an arm on the lever, a pin on the arm, a shifting fork for the gear having a notch in which said pin engages when the lever is in the intermediate portion of its arc of movement and from which the pin is released when the lever is in the end portions of its arc of movement.

2. In a device of the class described a clutch, a shaft driven thereby, a clutch operating sleeve on said shaft, a second shaft in line with the first said shaft, transmission mechanism for driving the second said shaft from the first including a reversing shifting gear, a hand lever for shifting said sleeve and gear, connections between the lever and sleeve such that the clutch is operated only at the respective ends of the arc of movement of the lever, a shifting fork in engagement with said shifting gear and having arcuate members with an intermediate notch, a pin on the lever engaging said members and notch, the pin engaging the notch in the intermediate portion of the arc of movement of the lever and engaging the curved members in the end portions of the arc of movement of the lever.

3. In a device of the class described a clutch, a shaft driven thereby, a clutch operating sleeve on said shaft, a second shaft in line with the first said shaft, transmission mechanism for driving the second said shaft from the first including a reversing shifting gear, a hand lever for shifting said clutch operating sleeve and gear, a clutch lever, an arm on the last mentioned lever having a pin at the end thereof, a cam slot on the hand lever engaged by said pin, said slot being concentric with the pivot of the hand lever in its intermediate portions and eccentric thereto at its end portions whereby the clutch shifting lever is at rest during the intermediate portion of the arc of movement of the hand lever and is operated to shift the clutch at the end portions of the arc of movement of the hand lever, and connections between the lever and gear by which the lever engages and shifts the gear in the intermediate portion only of its arc of movement.

4. In a device of the class described, a clutch, a shaft driven thereby, a clutch operating sleeve on said shaft, a second shaft in line with the first said shaft, transmission mechanism for driving the second said shaft from the first, including a reversing shifting gear, a hand lever for shifting said clutch operating sleeve and gear, connections between the lever and sleeve such that the clutch is operated only at the respective ends of the arc of movement of the clutch, an arm on the lever, a pin on the arm, a shifting fork for the gear having horns to be engaged by said pin, the pin-engaging edges of the horns being struck on an arc which is substantially the arc of movement of the pin, and there being an intermediate notch between said arcuate edges of the horns to be entered by the pin, whereby the pin moves the fork only when in engagement with said notch and is locked against movement by the pin in one direction when the pin is in engagement with either of said arcuate edges of the horns.

WILLIAM J. PEARMAIN.